(12) United States Patent
Kau et al.

(10) Patent No.: US 9,160,700 B2
(45) Date of Patent: Oct. 13, 2015

(54) MANAGING CONVERSATIONS, AWARENESS AND AVAILABILITY ON MULTI-DEVICE MESSAGING SYSTEMS BASED ON MODELING DEVICE USAGE OVER TIME

(71) Applicant: International Business Machines Corporation, Armonk, NY (US)

(72) Inventors: Christian B. Kau, Los Altos, CA (US); Jeffrey S. Pierce, Sunnyvale, CA (US); Christine M. Robson, San Jose, CA (US); Jerald T. Schoudt, Douglassville, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/968,457

(22) Filed: Aug. 16, 2013

(65) Prior Publication Data

US 2015/0052213 A1    Feb. 19, 2015

(51) Int. Cl.
*H04L 12/58* (2006.01)
*G06N 5/04* (2006.01)

(52) U.S. Cl.
CPC *H04L 51/26* (2013.01); *G06N 5/04* (2013.01); *H04L 51/14* (2013.01); *H04L 51/043* (2013.01)

(58) Field of Classification Search
None
See application file for complete search history.

(56) References Cited

U.S. PATENT DOCUMENTS

| | | | |
|---|---|---|---|
| 7,774,416 B2 | 8/2010 | Callanan et al. | |
| 7,792,913 B2 | 9/2010 | Chen | |
| 8,433,805 B2 | 4/2013 | Lowry | |
| 2002/0001307 A1 | 1/2002 | Nguyen et al. | |
| 2004/0243679 A1 | 12/2004 | Tyler | |
| 2005/0149620 A1 | 7/2005 | Kirkland et al. | |
| 2005/0149622 A1 | 7/2005 | Kirkland et al. | |
| 2006/0069686 A1 | 3/2006 | Beyda et al. | |
| 2007/0143433 A1 | 6/2007 | Daigle | |
| 2008/0028031 A1 | 1/2008 | Bailey et al. | |
| 2008/0268816 A1* | 10/2008 | Wormald | 455/412.2 |

(Continued)

FOREIGN PATENT DOCUMENTS

| | | |
|---|---|---|
| CN | 1620054 A | 5/2005 |
| CN | 1629870 A | 6/2005 |
| CN | 102325212 A | 1/2012 |

OTHER PUBLICATIONS

IBM; IP.com, "Method for dissimilar communication devices or methods to notify each other of availability or activation"; IPCOM000126514D; Jul. 22, 2005, pp. 1-2.

(Continued)

*Primary Examiner* — Idriss N Alrobaye
*Assistant Examiner* — Dayton Lewis-Taylor
(74) *Attorney, Agent, or Firm* — Jinesh Patel; Daniel E. Johnson

(57) ABSTRACT

Embodiments of the invention include a system and method for determining availability of a user on a plurality of communication devices includes collecting usage data of the user. An algorithm generates a predictive availability model of a user having a plurality of devices based on previous availability data collected, using a program executable by a processor of a computer. An algorithm prioritizes the devices of the user along with their respective messaging systems, to route a message from a sender to the user based on the predictive availability model, using the program. Routing logic is configured to route the message from the sender to the user based on the prioritization algorithm.

12 Claims, 2 Drawing Sheets

(56) References Cited

U.S. PATENT DOCUMENTS

| | | |
|---|---|---|
| 2011/0087744 A1 | 4/2011 | Deluca et al. |
| 2011/0307397 A1 | 12/2011 | Benmbarek |
| 2012/0150631 A1 | 6/2012 | Root et al. |
| 2013/0115910 A1* | 5/2013 | Whitten et al. ............... 455/405 |

OTHER PUBLICATIONS

Shadi E. Albouyeh et al., IBM Corporation U.S. Appl. No. 13/600,575, filed Aug. 31, 2012.

Daniel Avrahami et al., ACM Digital Library, Abstract for "Responsiveness in instant messaging: predictive models supporting interpersonal communication", Published in: CHI '06 Proceedings of the SIGCHI Conference on Human Factors in Computing Systems, pp. 731-740.

Mikey Campbell, Apple Insider, Apr. 30, 2013, "Apple's contact service intelligently determines when to send a text instead of a call", http://appleinsider.com/articles/13/04/30/apple-patents-method-to-determine-the-best-way-to-contact-someone, Accessed on Jul. 25, 2013.

Apple, "Apple gets patent for a new technology that can tell you whether to text or call your friends", http://thenextweb.com/apple/2013/04/30/apple-files-patent-for-a-new-technology-that-can-tell-you-whether-to-text-or-call-your-friends/, Accessed on Jul. 25, 2013.

Search Report and Written Opinion dated Oct. 29, 2014, for PCT/CN2014/084386, filed Aug. 14, 2014, 12 pages.

* cited by examiner

MANAGING CONVERSATIONS, AWARENESS AND AVAILABILITY ON MULTI-DEVICE MESSAGING SYSTEMS BASED ON MODELING DEVICE USAGE OVER TIME

BACKGROUND

1. Field

Embodiments of the invention relate to managing electronic conversations across multiple devices and messaging systems.

2. Background of the Disclosure

Messaging applications such as instant messaging (IM), text messaging, and group messaging are common on computing devices, and becoming even more prevalent. At the same time, the use of multiple clients, i.e., computing devices (for example, computers, mobile phones, tablets, laptops, netbooks, car communication systems, etc.) for communicating via messaging is also multiplying.

Current systems may recognize that users can use multiple devices, and may provide availability description capabilities that distinguish between desktop and mobile devices. However, these typical availability descriptions only provide a coarse view or high level information, that is, mobile device vs. desktop computer. Further, automatic availability updates based on activity on a device do not accurately reflect the user's preferences for receiving messages on one or more devices. In addition, when IM use expands beyond desktops and laptops, a user's actual availability may vary more than the options provided by typical IM systems (for example, available, away, in a meeting, offline, etc.). Current systems can support receiving messages simultaneously across multiple devices that are connected to the system, for example, accessing email from multiple devices.

BRIEF SUMMARY

In an aspect of the invention, a method determines availability of a user on a plurality of communication devices by collecting usage data. The method collects previous availability data for a user in relation to a plurality of devices used by the user. A predictive availability model is generated for the user regarding each of the plurality of devices based on the previous availability data collected. The devices are prioritized based on the predictive availability model to route a message from a sender to the user. The method routes the message from the sender to at least one of the user's devices based on the prioritization of the devices.

In another aspect of the invention, a system determines availability of a user on a plurality of communication devices by collecting usage data. A first algorithm generates a predictive availability model of a user having a plurality of devices based on previously collected availability data, and uses a program executable by a processor of a computer. A second algorithm prioritizes the devices of the user based on the predictive availability model to route a message from a sender to the user, using the program. Routing logic is configured to route the message from the sender to at least one of the user's devices based on the prioritization of the devices. An interface is configured to indicate to the sender the user's most likely available device.

In another aspect of the invention, a computer program product determines availability of a user on a plurality of communication devices by collecting usage data. The computer program product comprising a computer readable storage medium having program code embodied therewith, the program code is readable/executable by a processor to perform the following steps: collecting previous availability data for a user in relation to a plurality of devices used by the user; generating a predictive availability model for the user regarding each of the plurality of devices based on the previous availability data collected; prioritizing the devices based on the predictive availability model to route a message from a sender to the user; and routing the message from the sender to at least one of the user's devices based on the prioritization of the devices.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
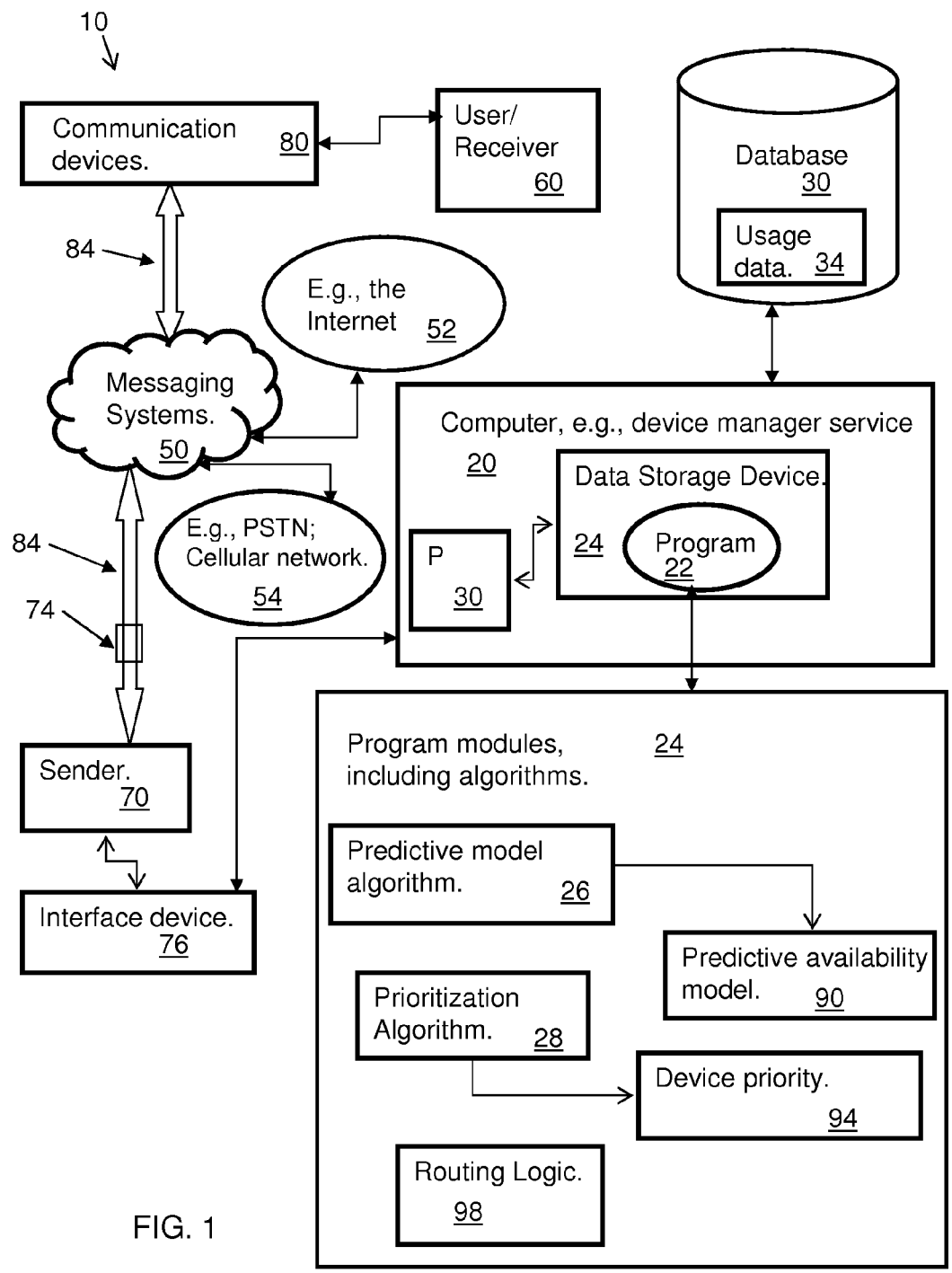
FIG. 1 is a schematic block diagram illustrating an overview of a system and methodology for determining availability of a user on a plurality of communication devices according to an embodiment of the disclosure.
Figure 2:
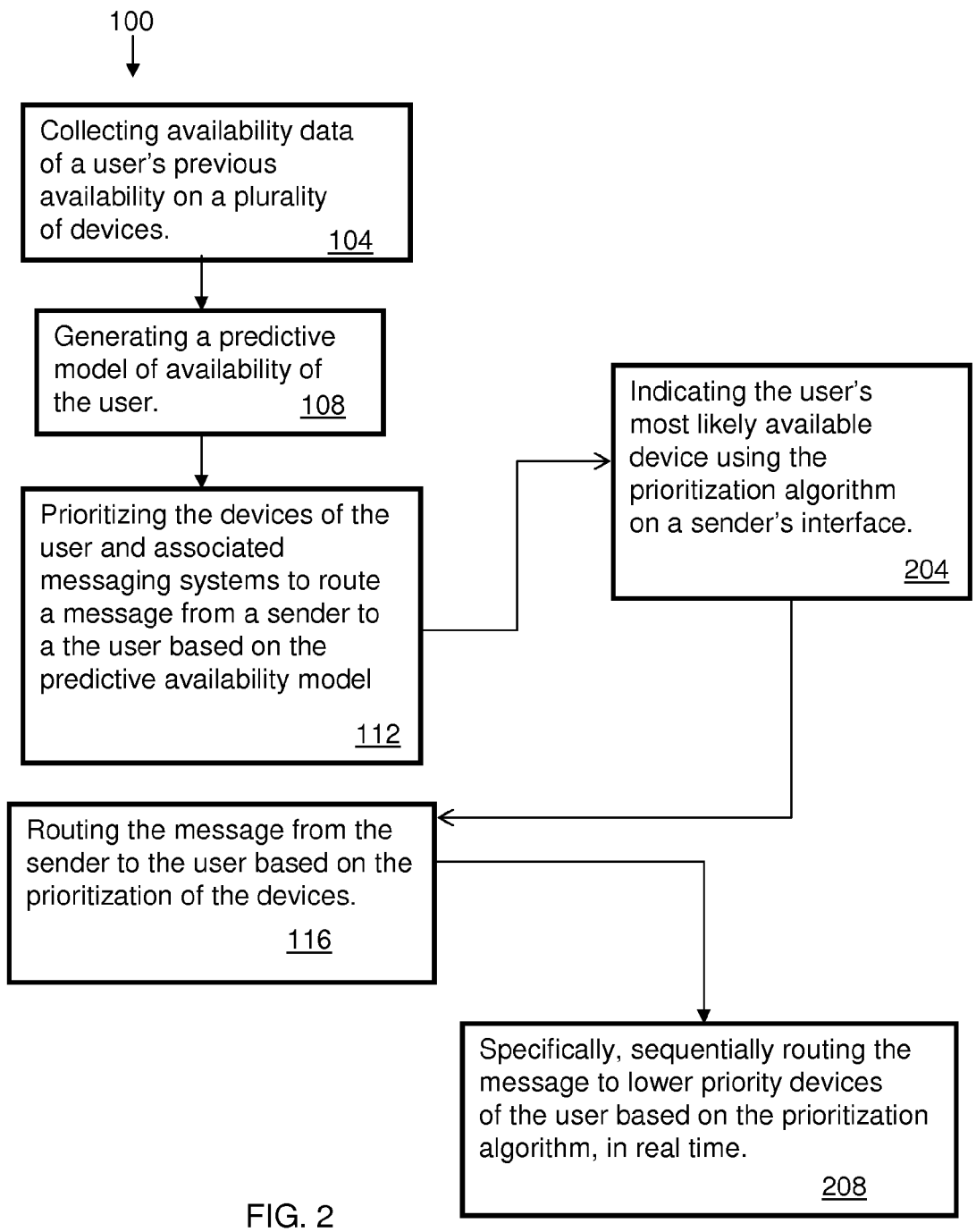
FIG. 2 is a flow chart illustrating a method for determining availability of a user on a plurality of communication devices as shown in FIG. 1.

Referring to FIGS. 1 and 2, a system 10 and method 100 according to an embodiment of the invention determines availability of a user 60 having a plurality of communication devices 80 by collecting usage data 34. The communication devices 80 may include, for example, a computer, or Personal Data Assistant (PDA), cell phone, notebook, or the like. The usage data 34, for example, may be stored in a database 30. The communication devices 80 are generically represented in FIG. 1 and may include cell phones, computers, a personal data assistant (PDA), a notepad computer, a laptop, a notebook computer, a netbook, a tablet, or a car communication system. Each of the communication devices 80 has an associated messaging system 50 generically represented in FIG. 1. The messaging systems 50 may include, for example, cell phone networks, the Internet, and short messaging service (SMS). SMS is a text messaging service component of phone, web, or mobile communication systems, using standardized communications protocols which allows the exchange of short text messages between fixed line or mobile phone devices. More specifically, the messaging communications systems 50 may include the Internet 52, or a public switched telephone network (PSTN) 54. The PSTN 54 may further include telephone lines, fiber optic cables, microwave transmission links, cellular networks, communications satellites, and undersea telephone cables. The Internet may facilitate numerous texting techniques. For example, using a cell phone or laptop computer to send text messages via Multimedia Messaging Service (MMS) (related to SMS) as a technique for sending messages that include multimedia content to and from mobile phones, or to and from one or more email accounts via the Internet.

The method 100 includes collecting availability data of a user's previous availability on a plurality of devices, in step 104, as shown in FIG. 2. A predictive model algorithm 26 generates a predictive availability model 90 of availability of the user having a plurality of devices based on the previous availability data collected, in step 108. A prioritization algorithm 28 prioritizes the devices 80 of the user 60 and their associated messaging systems 50 to route a message 74 from a sender 70 to the user 60 based on the predictive availability model 90, using the program 22, as in step 112. Routing logic 98 is configured to route the message (e.g., a route is shown as arrows 84) from the sender to the user based on the prioritization algorithm 28, as in step 116.

The previous steps may be completed using a program 22 executable by a processor 30 of a computer 20, as shown in FIG. 1. The program may be embodied on a computer readable storage medium, for example, a data storage device 24. The program may be installed on a user's device or be provided as a service.

The computer 20 can be part of a service for providing the method disclosed herein as a device manager service. The method 100 may be embodied in a program 22 embodied on a computer readable storage device, e.g., data storage device 24, and is executable by a processor 30 of the computer 20 (i.e., execute program steps, code, or program code). The program or executable instructions therefrom, may be offered as a service by a provider. The program may also be stored and run locally on a user device. The computer 20 and program 22 shown in FIG. 1 are generic representations of a computer and program that may be local to a user, or provided as a remote service, such as a website accessible using the Internet. The computer 20 also generically represent herein a computer device or system such as a personal data assistant, a laptop, or desktop computer, etc., or part of one or more servers, alone or as part of a datacenter. The computer system 20 can include a network interface, and input/output (I/O) interface(s) which allow for input and output of data with an external device that may be connected to the computing device. A network interface may provide communications between the computing device and a computer network. The program 22 may include program modules 24 for executing specific steps, routines, sub-routines, instructions or code, of the program for performing one or more steps of the method and system described herein. Such modules 24 are generically represented in FIG. 1.

In one embodiment of the invention, referring to FIG. 2, a sender's interface device 76 may indicate the user's most likely available device using the prioritization algorithm, as in step 104. The sender then may choose the user's device with the highest priority, that is, the highest likelihood of reaching the user. The selection may also be automatic. The system 10 and method 100 may sequentially route the message from higher priority devices to lower priority devices of the user based on the prioritization algorithm using the routing logic, in realtime, as in step 208. That is, higher priority indicates the highest likelihood of reaching the user.

The user's previous availability may include user response times/availability for each of the plurality of devices and respective messaging systems. The plurality of devices may include: a laptop, a tablet, a cell phone; and the messaging systems may include text instant messaging, and short messaging service (SMS). The user's previous availability thereby includes determining the user's availability on each of a plurality of devices, for example, based on time, and access such as signal strength to complete a communication (e.g., cell phone signal, or electronic message). This availability data is collected as in step 104 of the method 100.

Thereby, the method 100 according to the present disclosure provides a determination of availability of a user having a plurality of communication devices by collecting usage data. The method 100 includes the steps of collecting availability data of a user's availability on a plurality of devices 80, as in step 104. A predictive model of availability 90 of the user is generated based on the previous availability data collected, as in step 108. The method 100 prioritizes the devices 80 of the user 60 (also referred to as a receiver) and associated messaging systems 50 to route the message 74 from the sender 70 to the user 60 based on the predictive availability model, in step 112. The method 100 routes the message 74 from the sender 70 to the user 60 based on the prioritization of the devices, as in step 116.

Additionally, a pattern can be developed from past use and availability and used to determine availability of a user's device. For example, a user may be typically be available on a cell phone in the evening and on a computer during the day, or consistently attend an event wherein he is reachable on one device. Such statistical factors can be used in determining the most likely device to reach the user on. Factors which can be used to determine a pattern may include, spatial, temporal, and social contexts, for example, a location, a time period, or attendance at a social gathering. Thus, the above factors can be used in selecting which device(s) to route messages to.

The previous availability data collected can include an availability time for each of the devices, or a period of time where a device is typically available, based on a statistical analysis of past data. The predictive availability model can use the availability time or time period for each of the devices to determine the most likely available device.

An availability time or a time period can be determined for each of the devices and included in the previous availability data collected in step 104 of the method 100. The step of generating a predictive availability model 108 can include using the availability times and a device availability rating, which may include a statistical conclusion of the device most often used, or the device most often used at a location.

According to the present disclosure, the method 100 can be an add-on to a messaging system or provide a service which gathers data about a user's activity in situ over time and across devices, for example, a user's location, times of use, and patterns of response. The method can be embodied in a computer program which is installed locally on one or more users' devices, or accessed as a service, for example, on one or more remote servers. The data can be used to build a model of the user's availability and likelihood of response per-device. The model can be used to route messages for the greatest likelihood of receipt and speed of receipt. Also, the model can be used to determine and present another user's availability or your own availability. A user may also select a receiver's device for receipt of a message based on an availability rating. A user can also select a recipient's device based on an availability ranking in combination with other considerations such as time of day or privacy issues, for instance selecting a cell phone instead of a work computer as a recipient of a message for a personal message in consideration of work policies.

The method can also include presenting a ranking of available device in order of availability. The rankings can include an ordered list, colors, a progress bar, a number ranking, or another indication.

The method of the present disclosure can include ranking devices in order of availability, and automatically sending a message from a sender to a recipient from the highest ranked device to lower ranked devices until the recipient reads and/or responds to the message. The above avoids broadcasting the message to all devices, which reduces information overload on the user/recipient.

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multi-processor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. The computer readable storage medium is defined as a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, or a magnetic storage device, or any suitable combination of the foregoing. The computer readable storage medium excludes any transitory media, such as radio waves, or other freely propagating electromagnetic waves, electromagnetic waves propagating through a waveguide or other transmission media or electrical signals.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for determining availability of a user on a plurality of communication devices by collecting usage data, comprising:
   collecting previous availability data for a plurality of devices of a user, wherein the previous availability data for the plurality of devices includes information detailing an availability rating for each device of the plurality of devices determined based on at least an availability time and a signal strength associated with each device of the plurality of devices;
   generating a predictive availability model for the user regarding each of the plurality of devices based on the previous availability data collected;
   prioritizing the devices based on the predictive availability model to route a message from a sender to the user;
   determining a device of the plurality of devices that has a highest level of availability based on the predictive availability model;
   indicating, on an interface, the device that has the highest level of availability, wherein the device that has the highest level of availability is the only device with an accompanying indication; and
   routing the message from the sender to at least one of the user's devices based on the prioritization of the devices and privacy considerations associated with each of the user's devices indicated by way of user input.

2. The method of claim 1, further comprising:
   sequentially routing the message from higher priority devices to lower priority devices of the plurality of devices based on the prioritization algorithm, in realtime.

3. The method of claim 1, wherein the previous availability data includes user response times and availability for each of the plurality of devices and their respective messaging systems.

4. The method of claim 1, wherein the plurality of devices include: a laptop, a tablet, a cell phone, and the devices communicate with respective messaging systems wherein the messaging systems include text instant messaging, or short messaging service (SMS).

5. A system for determining availability of a user on a plurality of communication devices by collecting usage data, comprising:
   a first algorithm which generates a predictive availability model of a user having a plurality of devices based on previously collected availability data, wherein the previously collected availability data for the plurality of devices includes information detailing an availability rating for each device of the plurality of devices determined based on at least an availability time and a signal strength associated with each device of the plurality of devices, using a program executable by a processor of a computer;
   a second algorithm which prioritizes the devices of the user based on the predictive availability model to route a message from a sender to the user, using the program;
   routing logic configured to route the message from the sender to at least one of the user's devices based on the prioritization of the devices and privacy considerations associated with each of the user's devices indicated by way of user input; and
   an interface configured to indicate to the sender the user's most likely available device based on the predictive availability model, wherein the user's most likely available device is the only device with an accompanying indication.

6. The system of claim 5, wherein the routing logic sequentially routes the message from higher priority devices to lower priority devices of the plurality of devices based on the prioritization algorithm, in realtime.

7. The system of claim 5, wherein the previously collected availability data includes user response times/availability for each of the plurality of devices and their respective messaging systems.

8. The system of claim 5, wherein the plurality of devices include: a laptop, a tablet, a cell phone, and the devices communicate with respective messaging systems wherein the messaging systems include text instant messaging, or short messaging service (SMS).

9. A computer program product for determining availability of a user on a plurality of communication devices by collecting usage data, the computer program product comprising a computer readable storage medium having program code embodied therewith, the program code being readable/executable by a processor to perform:
   collecting previous availability data for a plurality of devices of a user, wherein the previous availability data for the plurality of devices includes information detailing an availability rating for each device of the plurality of devices determined based on at least an availability time and a signal strength associated with each device of the plurality of devices;
   generating a predictive availability model for the user regarding each of the plurality of devices based on the previous availability data collected;
   prioritizing the devices based on the predictive availability model to route a message from a sender to the user
   determining a device of the plurality of devices that has a highest level of availability based on the predictive availability model;
   indicating, on an interface, the device that has the highest level of availability, wherein the device that has the highest level of availability is the only device with an accompanying indication; and
   routing the message from the sender to at least one of the user's devices based on the prioritization of the devices and privacy considerations associated with each of the user's devices indicated by way of user input.

10. The computer program product of claim 9, further comprising:
    sequentially routing the message from higher priority devices to lower priority devices of the user based on the prioritization algorithm, in realtime.

11. The computer program product of claim 9, wherein the previous availability data includes user response times/availability for each of the plurality of devices and their respective messaging systems.

12. The computer program product of claim 9, wherein the plurality of devices include: a laptop, a tablet, a cell phone, and the devices communicate with respective messaging systems, respectively, wherein the messaging systems include text instant messaging, or short messaging service (SMS).

* * * * *